United States Patent [19]

Scott et al.

[11] Patent Number: 4,940,915
[45] Date of Patent: Jul. 10, 1990

[54] OSCILLATING CRYSTAL FORCE TRANSDUCER AND METHOD OF MAKING

[75] Inventors: Douglas R. Scott; Peggy L. Goddard; Joseph P. Wagner, all of Knoxville, Tenn.

[73] Assignee: Robertshaw Controls Company, Richmond, Va.

[21] Appl. No.: 266,405

[22] Filed: Nov. 2, 1988

Related U.S. Application Data

[62] Division of Ser. No. 167,847, Mar. 14, 1988, Pat. No. 4,799,301.

[51] Int. Cl.$^5$ .............................................. H01L 41/08
[52] U.S. Cl. ..................................... 310/338; 310/356; 73/774; 73/778
[58] Field of Search ................................. 310/351–353, 310/354–356, 338, 339, 328; 73/774, 775, 778, 781, 514, 517 AV, 760, 763, 700, 703, 754, DIG. 4

[56] References Cited

U.S. PATENT DOCUMENTS

| | | | |
|---|---|---|---|
| 2,002,167 | 5/1935 | Bechmann | 310/353 X |
| 3,274,828 | 9/1966 | Pulvari | 73/141 |
| 4,126,801 | 11/1978 | Corbett | 310/338 X |
| 4,130,624 | 12/1978 | Walker | 310/354 X |
| 4,175,243 | 11/1979 | Corbett | 310/338 |
| 4,439,705 | 3/1984 | Corbett | 310/338 |
| 4,485,323 | 11/1984 | Corbett | 310/338 |
| 4,703,216 | 10/1987 | Corbett | 310/338 |
| 4,799,301 | 1/1989 | Scott et al. | 310/338 X |

Primary Examiner—Mark O. Budd
Attorney, Agent, or Firm—Candor, Candor & Tassone

[57] ABSTRACT

An oscillating crystal force transducer and method of making the same are provided, the transducer comprising support structure, a plate-shaped piezo-electric crystal having opposed sides and a peripheral edge extending between the opposed sides, and two seating members carried by the support structure and respectively engaging the peripheral edge of the crystal and arranged to apply a force to the crystal along a line extending through the crystal from one of the seating members to the other of the seating members, the support structure comprising a looped spring member having opposed ends spaced from each other to define the mouth of the looped spring member and respectively carrying the seating members whereby the crystal is disposed in the mouth of the looped spring member between the seating members thereof.

17 Claims, 6 Drawing Sheets

OSCILLATING CRYSTAL FORCE TRANSDUCER AND METHOD OF MAKING

CROSS REFERENCE TO RELATED APPLICATION

This application is a divisional patent application of its copending parent application, Ser. No. 167,847 filed Mar. 14, 1988, now Pat. No. 4,799,301.

BACKGROUND OF THE INVENTION

1. Field of the Invention

This invention relates to a new oscillating crystal force transducer and to a new method of making an oscillating crystal force transducer.

2. Prior Art Statement

It is known to provide an oscillating crystal force transducer comprising support means, a plate-shaped piezoelectric crystal having opposed sides and a peripheral edge means extending between the opposed sides, and two seating members carried by the support means and respectively engaging the peripheral edge means of the crystal and arranged to apply a force to the crystal along a line extending through the crystal from one of the seating members to the other of the seating members. For example, see the Pulvari U.S. Pat. No. 3,274,828; the Corbett U.S. Pat. No. 4,126,801; the Walker U.S. Pat. No. 4,130,624; the Corbett U.S. Pat. No. 4,175,243 and the Corbett U.S. Pat. No. 4,703,216.

SUMMARY OF THE INVENTION

It is one feature of this invention to provide a new oscillating crystal force transducer having unique means for supporting a plate-shaped piezo-electric crystal therein.

In particular, it is well known that it is necessary to mount a quartz crystal or the like in such a manner that a large force can be concentrated at a preselected location on the edge surface thereof so that when the crystal is properly mounted and is provided with proper electrical excitation, the crystal will vibrate at a predetermined frequency which is proportional to the applied force at the edge surface of the crystal. The crystal should be firmly mounted in its intallation position and not shift due to ambient vibration, shock, orientation, etc. Also, the cost of the mounting arrangement should be held to a minimum and the method of assembly should be adaptable to low-cost high-production assembly machine techniques as one of the end uses of such a transducer is an automotive application thereof.

Accordingly, it was found according to the teachings of this invention that such a transducer can be provided by utilizing a looped spring member to mount the crystal in the transducer, the looped spring member having opposed end means spaced from each other to define the mouth of the looped spring member and respectively carrying seating members which engage the peripheral edge means of the crystal so that the crystal is disposed in the mouth of the looped spring member between the seating members thereof.

For example, one embodiment of this invention provides an oscillating crystal force transducer comprising support means, a plate-shaped piezo-electric crystal having opposed sides and a peripheral edge means extending between the opposed sides, and two seating members carried by the support means and respectively engaging the peripheral edge means of the crystal and arranged to apply a force to the crystal along a line extending through the crystal from one of the seating members to the other of the seating members, the support means comprising a looped spring member having opposed end means spaced from each other to define the mouth of the looped spring member and respectively carrying the seating members whereby the crystal is disposed in the mouth of the looped spring member between the seating members thereof.

Accordingly, it is an object of this invention to provide a new oscillating crystal force transducer having one or more of the novel features of this invention as set forth above or hereinafter shown or described.

Another object of this invention is to provide a new method of making an oscillating crystal force transducer, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
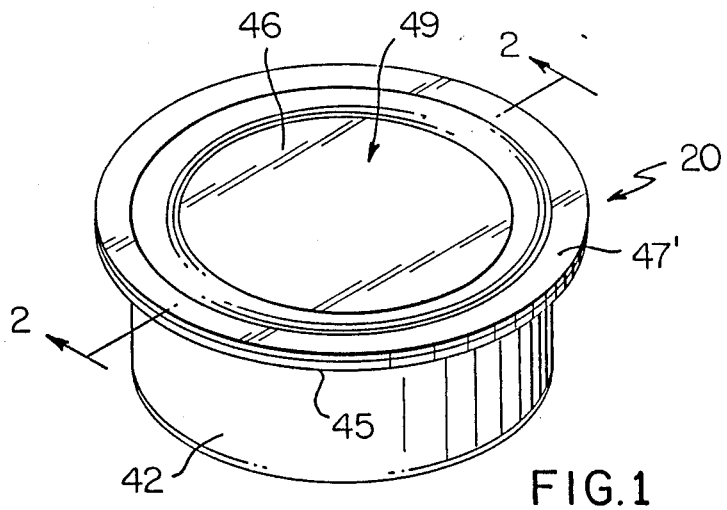
FIG 1 is a top perspective view of one embodiment of the new oscillating crystal force transducer of this invention.

While the various features of this invention are hereinafter illustrated and described as being particularly adapted to provide an oscillating crystal force transducer wherein the force is provided by a pressure differential acting across a diaphragm means thereof, it is to be understood that the various features of this invention can be utilized singly or in various combinations thereof to provide transducers that have the force applied thereto by other means as desired.

Therefore, this invention is not to be limited to only the embodiments illustrated in the drawings, because the drawings are merely utilized to illustrate some of the wide variety of uses of this invention.

Referring now to FIGS. 1–5, a new oscillating crystal force transducer of this invention is generally indicated by the reference numeral 20 and comprises a support means 21 carrying a plate-shaped piezo-electric quartz crystal 22 between a pair of seating members 23 that are arranged in a manner hereinafter set forth to apply a force to the crystal 22 along a line extending through the crystal 22 from one of the seating members 23 to the other of the seating members 23 whereby the crystal 22 will vibrate at a predetermined frequency that is substantially proportional to that applied force in a manner well known in the art. For example, see the aforementioned five United States patents, the patent to Pulvari, No. 3,274,828; the patent to Corbett, No. 4,126,801; the patent to Walker, No. 4,130,624; the patent to Corbett, No. 4,175,243 and the patent to Crobett, No. 4,703,216 as well as the Corbett U.S. Pat. No. 3,541,849; the Corbett U.S. Pat. No. 3,891,870; the Corbett U.S. Pat. No. 4,020,448; the Corbett U.S. Pat. No. 4,067,241; the Corbett U.S. Pat. No. 4,439,705 and the Corbett U.S. Pat. No. 4,485,323 whereby these eleven U.S. patents are being incorporated into this disclosure by this reference thereto.

Therefore, since the use of and the details of the operation of the crystal 22, as well as the electrical means for transmitting the signal means from such crystal 22, are all well known in the art, a further discussion of the theory and operation of the crystal means 22 in a force transducer will not be set forth as the unique features of this invention are directed to the means for mounting the crystal 22 in a transducer and such unique structure will now be described.

As illustrated in FIGS. 2–7, the support means 21 of the transducer 20 includes a one-piece looped spring member 24 having opposed end means 25 and 26 spaced from each other to define a mouth 27 of the looped spring member 24 and respectively carry the seating members 23 whereby the crystal 22 is adapted to be disposed in the mouth 27 of the looped spring member 24 between the seating members 23 thereof, the looped spring member being generally U-shaped or C-shaped as illustrated.

While the looped spring member 24 can be formed of any suitable material, the same can be made from rather hard, unyielding, high carbon steel or stainless steel and is so shaped that the natural spring force of the looped spring member 24 is to move the end means 25 and 26 toward each other after the crystal 22 has been fully mounted between the seating members 23 thereof in a manner hereinafter set forth. In this manner, the natural force of the looped spring member 24 firmly holds the crystal 22 in its mounted position whereby the crystal 22 will not shift in the transducer 21 should the transducer 21 be subjected to ambient vibrations, shocks, orientations, etc.

Figure 4:
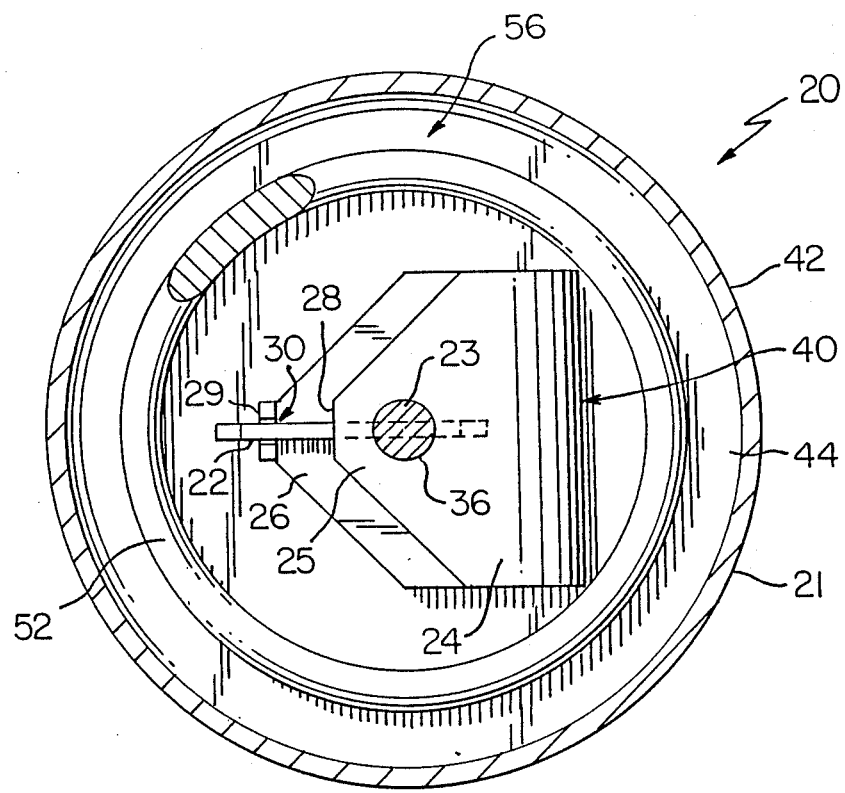
FIG. 4 is cross-sectional view taken on line 4—4 of FIG. 2.
Figure 5:
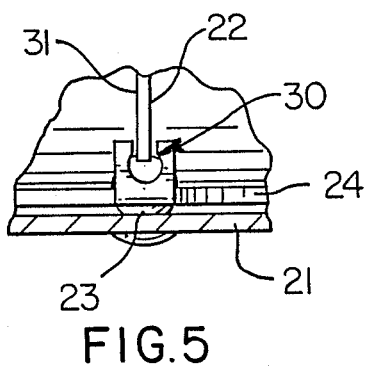
FIG. 5 is a fragmentary cross-sectional view taken on line 5—5 of FIG. 2.

The opposed end means 25 and 26 of the looped spring member 24 are tapered toward the respective outer ends 28 and 29 thereof with the end 28 being substantially flat and the end 29 being turned upwardly and having a slot means 30 interrupting the same so as to receive part of the crystal 22 therein as illustrated in FIG. 5 and thereby prevent the crystal 22 from pivoting relative to the looped spring means 24 about the line that extends between the seating members 23, the free end 29 of the end means 26 extending outwardly beyond the free end 28 of the other end means 25 in the manner illustrated in FIG. 4.

The crystal 22 has opposed substantially flat parallel sides 31 and 32 and has a peripheral edge means 33 extending therebetween, the edge means 33 having two substantially flat and straight parallel sections 34 and two opposed like arcuate sections 35 extending therebetween.

The seating members 23 comprise substantially spherical balls that are formed of any suitable relatively soft material, such as soft brass, and are respectively press-fitted or otherwise secured in suitable openings 36 passing in aligned manner through the opposed end means 25 and 26 of the looped spring member 24 whereby the seating members 23 are adapted to respectively engage against the flat straight sections 34 of the peripheral edge means 33 of the crystal 22.

When the balls 23 are assembled in the openings 36 of the looped spring member 24, the balls 23 can be pressed into the opening means 36 from within the looped spring member 24 so that the balls 23 will be deformed through the openings 36 and define annular shoulder means 37 which engage respectively against inside surfaces 38 of the end means 25 and 26 of the looped spring member 24 and thereby prevent further movement of the balls 23 outwardly through the openings 36.

Figure 3:
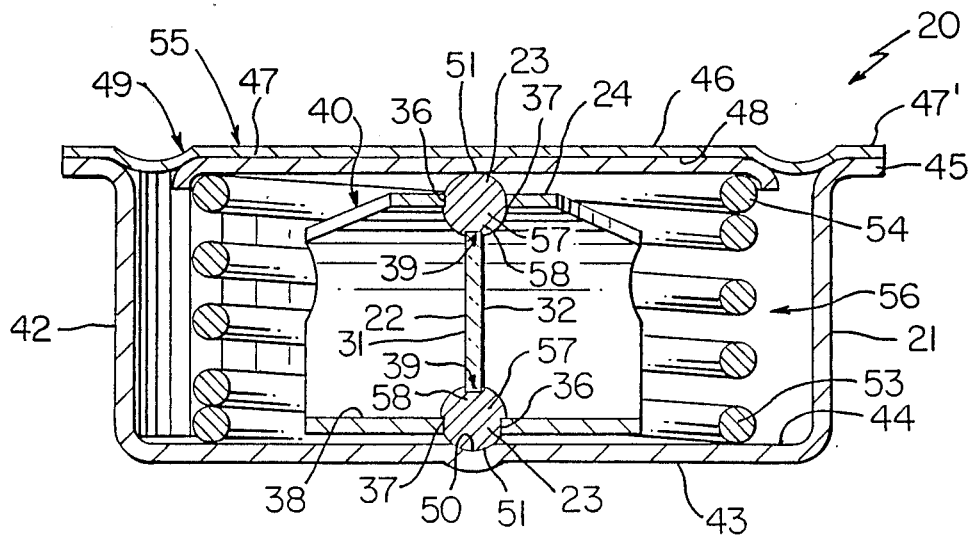
FIG. 3 a cross-sectional view taken on line 3—3 of FIG. 2.

After the crystal 22 has been subsequently inserted between the thus mounted balls 23 in the manner illustrated in FIGS. 6 and 7 so that the end means 25 and 26 are spread apart to produce the natural resiliency of the spring member 24 that tends to move the end means 25 and 26 toward each other and thereby firmly hold the crystal 22 between the seating members 23, a relatively large force, such as ten to twenty pounds, is applied on the seating members 23 to move the seating members 23 toward the crystal 22 and thereby cause the edge means 33 of the crystal 22 to embed into the seating members 23 to form slots or saddles 39 in the seating members 23 as illustrated in FIG. 3 which are believed to eliminate subsequent chipping and shifting of the crystal 22 relative to the seating members 23 during the use of the transducer 20.

In this manner, once the crystal 23 has been embedded into the seating members 23 in the manner previously described, the resulting self-contained subassembly 40 comprises the looped spring member 24, seating members 23 and crystal 22 with the looped spring member 24 having a natural spring force tending to move the end means 25 and 26 thereof toward each other to thereby firmly hold the crystal 22 in its assembled condition.

Figure 9:
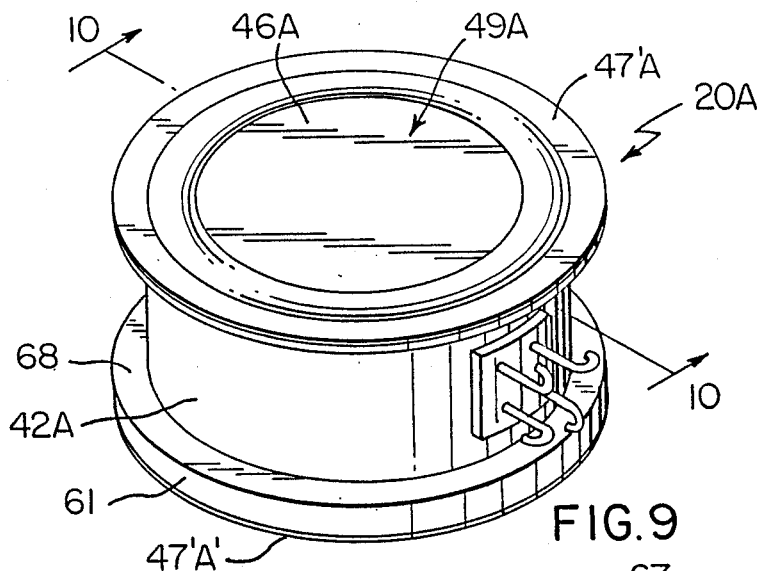
FIG. 9 is a top perspective view of another embodiment of the new oscillating crystal force transducer of this invention.
Figure 12:
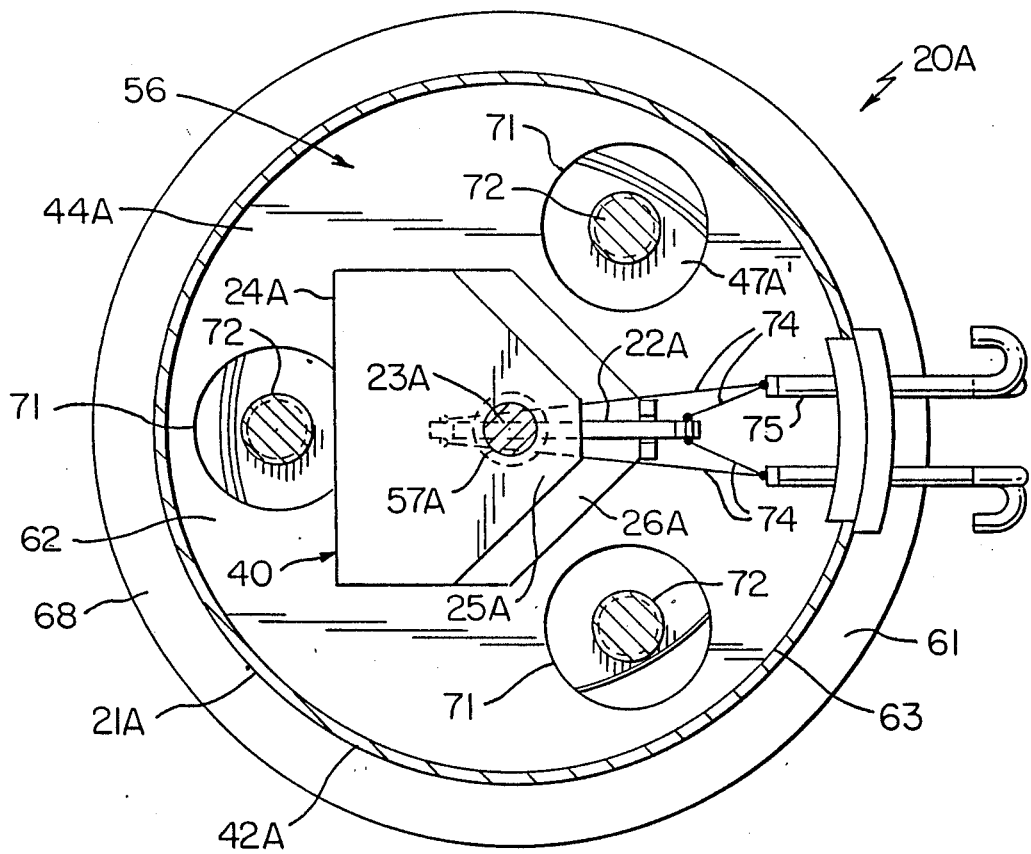
FIG. 12 is a cross-sectional view taken on line 12—12 of FIG. 10.
Figure 13:
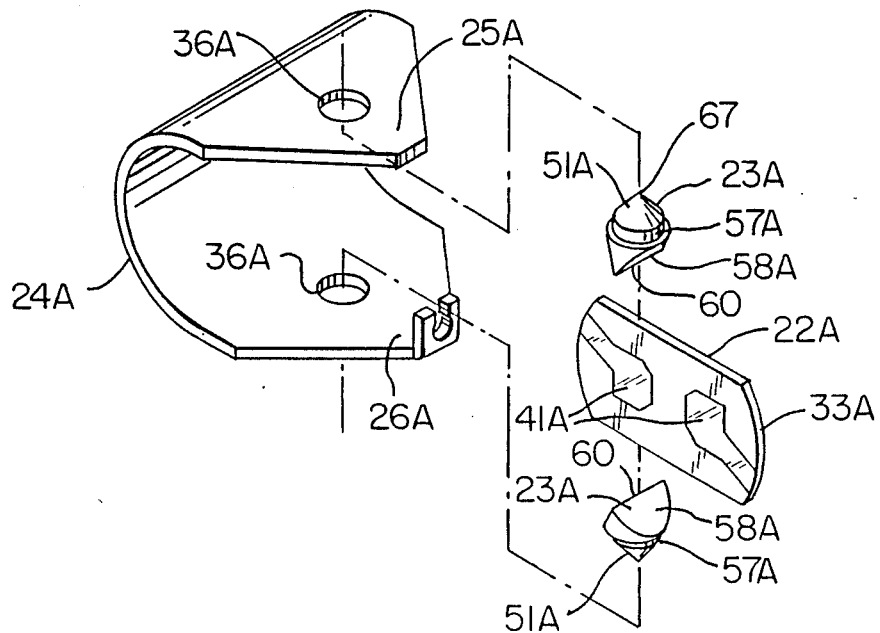
FIG. 13 is an exploded perspective view of certain parts of the transducer of FIGS. 9–12.
Figure 14:
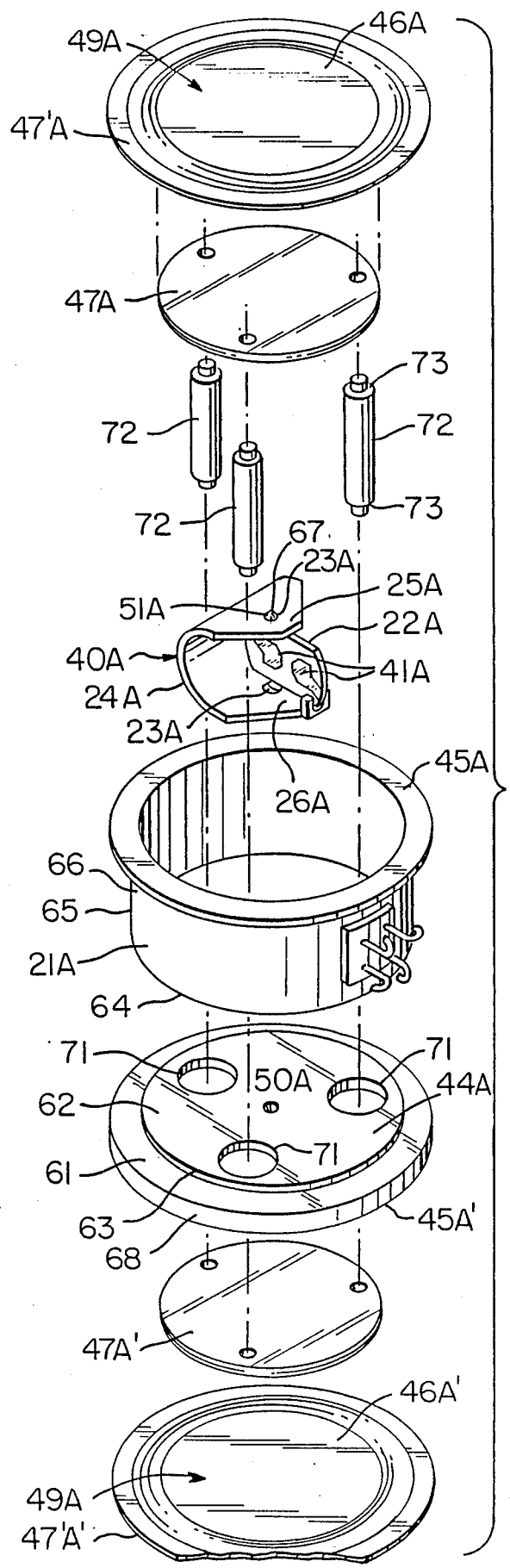
FIG. 14 Is an exploded perspective view of all the parts of the transducer of FIGS. 9–12.

The crystal 22 has suitable conductor means 41 disposed on the opposed flat sides 31 and 32 thereof so that the conductive portions 41 can be readily interconnected to leads (not shown) that will extend from the crystal 22 to points exterior of the support structure 21 in a manner well known in the art so that the electrical signals produced by the crystal 22 can be measured in a manner conventional in the art. For example, see FIG. 22 of the aforementioned Corbett U.S. Pat. No. 4,703,216 and see FIGS. 9, 10 and 12 of this application for a showing of such lead means.

The supporting structure 21 of the transducer 20 includes a cup-shaped metallic member 42 having a closed end wall 43 that defines a substantially flat inside surface means 44 at one end thereof and having its open end defined by an outwardly directed annular flange 45 which is adapted to be closed by a flexible metallic diaphragm 46 having its outer peripheral portion 47' adapted to be secured to the annular flange 45, such as by soldering or the like.

A metallic diaphragm backup plate 47 is adapted to be secured to the medial portion of the inside surface 48 of the flexible diaphragm 46, such as by soldering or the like, and thereby cooperate with the flexible diaphragm 46 to provide a movable wall 49 for the transducer 20 in a manner hereinafter set forth.

Figure 2:
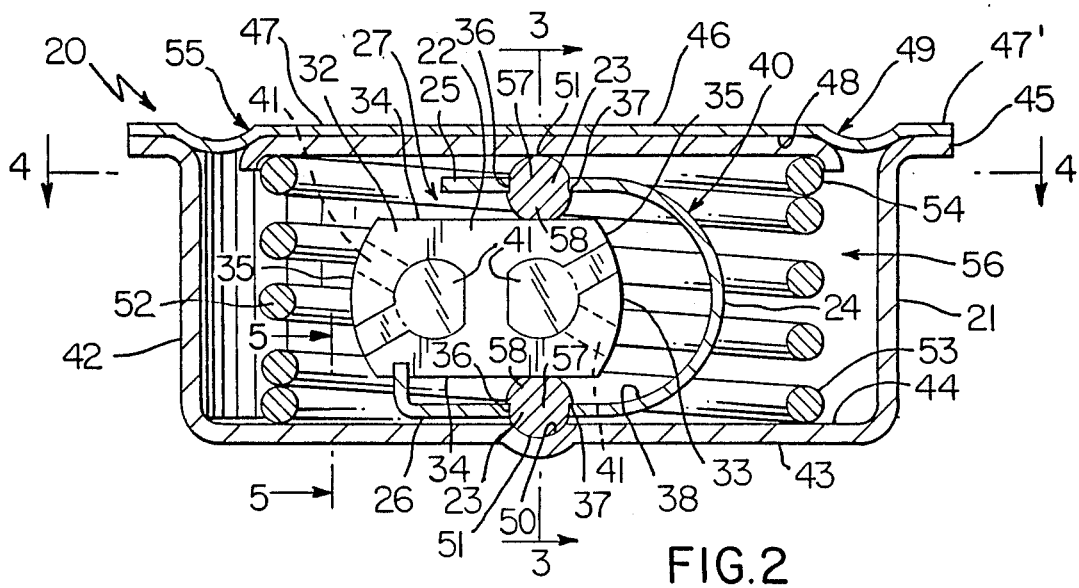
FIG. 2 is an enlarged cross-sectional view taken on line 2—2 of FIG. 1.

A dimple or indentation 50 is formed in the central portion of the inside surface 44 of the cup-shaped housing member 42 and is of a size so that the same will receive an outwardly protruding portion 51 of the lower seating member 23 therein in the manner illustrated in FIG. 2 so that the subassembly 40 will be positively located within the cup-shaped housing member 42, the subassembly 40 being secured in the housing 42 by securing the projecting portion 51 of the lower seating member 23 in the dimple 50 such as by soldering or the like.

In this manner, the outwardly protruding portion 51 of the upper seating member 23 will engage against the central portion of the backup plate 48 of the available wall 49 and with the lower seating member 23 being secured in the dimple or indentation 50 as previously set forth, the subassembly 40 will not shift within the cup-shaped housing member 42 even though the movable wall 49 tends to move upwardly and downwardly relative thereto as will be apparent hereinafter.

A compression spring 52 is provided for the transducer 20 and has one end 53 thereof for bearing against the inside surface 44 of the bottom wall 43 of the cup-shaped housing member 42 and the other end 54 thereof for bearing against the back plate 47 of the movable wall 49.

When the seating members 23 are respectively assembled in the openings 36 of the end means 25 and 26 of the looped spring member 24 in the manner previously set forth, it can be seen that a medial portion 57 of each seating member 23 is disposed in its respective opening 36 while the outer portion 51 thereof extends outboard of the respective end means 25 or 26 and an inner portion 58 thereof extends inboard of the respective end means 25 or 26 and faces toward the end portion 58 of the other seating member 23, the inner end portion 58 of the seating member 23 respectively having the crystal 22 embedded therein as previously set forth.

Figure 7:
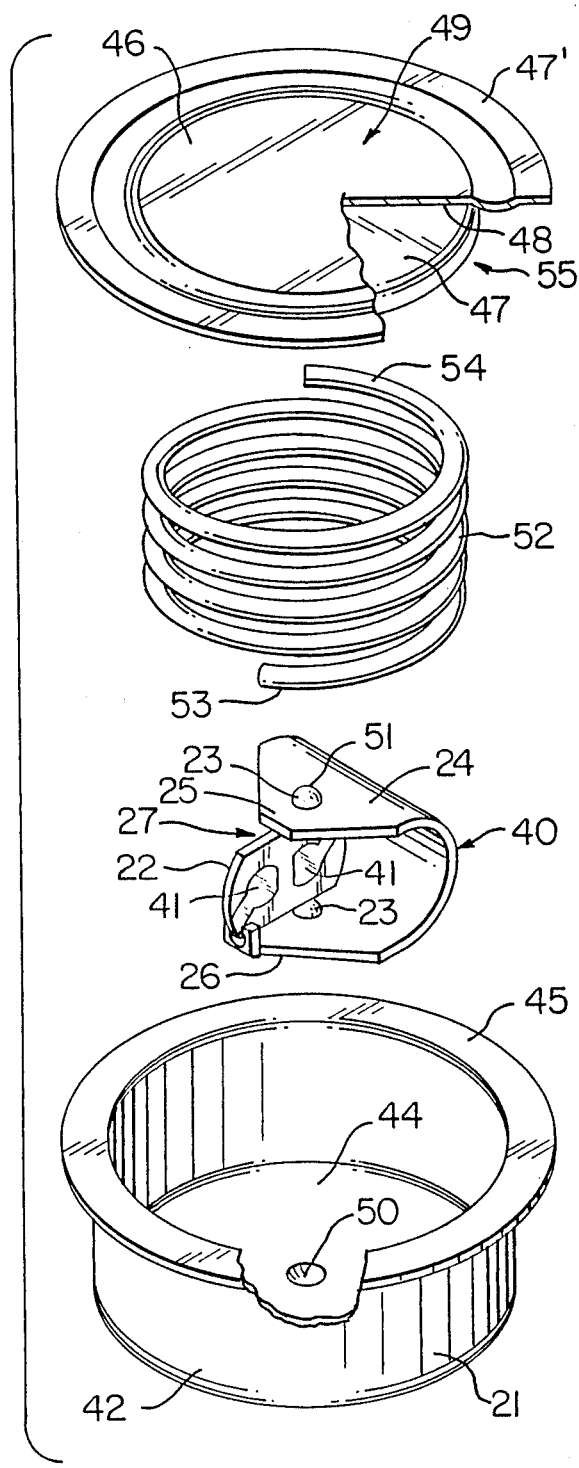
FIG. 7 is an exploded perspective view of the parts of FIG. 6 with certain of the parts being assembled together to form subassemblies thereof.

After the subassembly 40 is formed, the diaphragm plate 47 can be soldered to the diaphragm means 46 to form a subassembly 55 thereof so that the parts are now arranged as illustrated in FIG. 7 to form a completed transducer 20 in a manner now to be set forth.

Figure 8:
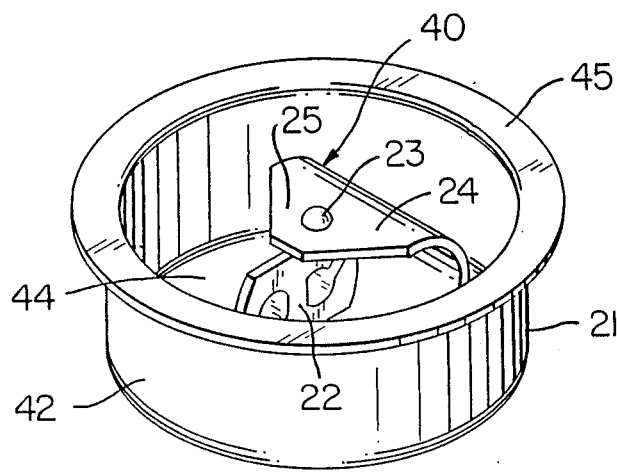
FIG. 8 is a top perspective view of certain parts illustrated in FIG. 7 after the same have been assembled together.
Figure 6:
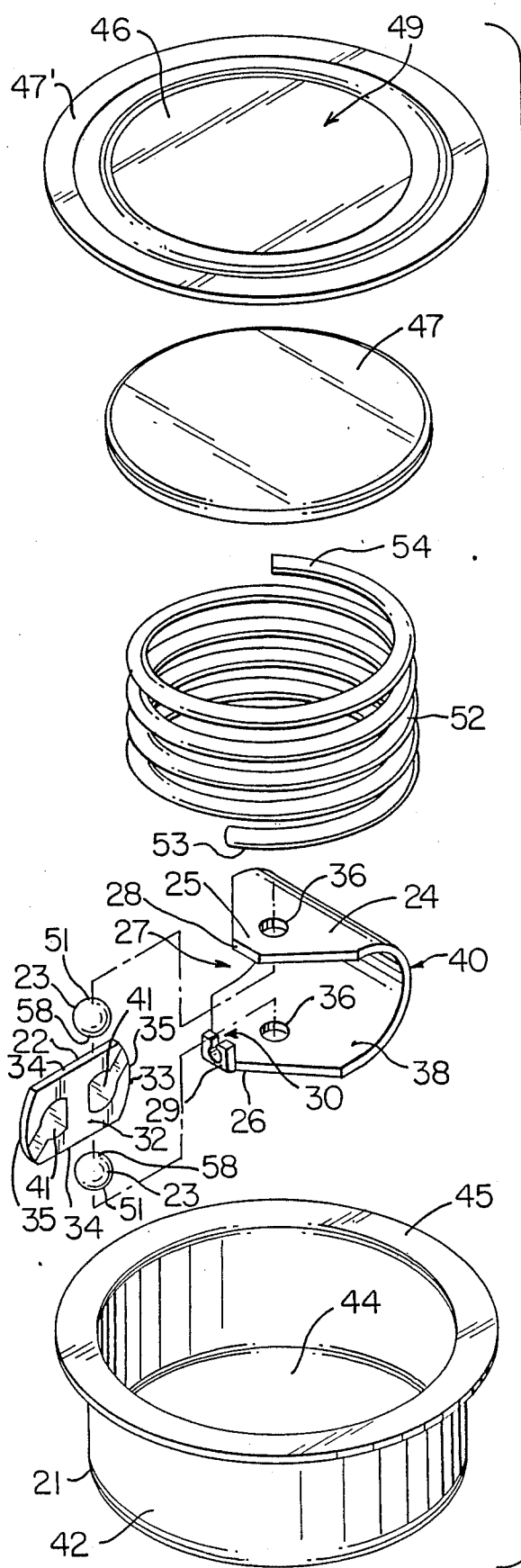
FIG. 6 is an exploded perspective view of the various parts that form the oscillating crystal force transducer of FIGS. 1–5.

When it is desired to assemble a transducer 20 of this invention from the parts thereof that are illustrated in FIG. 6, the two subassemblies 40 and 55 are first formed in the manner previously set forth and the subassembly 40 is then disposed in the cup-shaped housing member 21 with its lower seating member 23 received in the dimple 50 and is secured therein by soldering or the like so that the subassembly 40 is now firmly fastened to the cup-shaped housing member 42 as illustrated in FIG. 8.

Thereafter, the load spring 52 is disposed in the cup-shaped housing member 42 with its end 53 against the surface means 44 and the subassembly 55 of the movable wall means 49 is assembled over the flange 45 of the cup-shaped member 42 with a suitable assembly fixture (not shown) while the device is in a vacuum chamber. While the wall means 49 is held in place on the flange 45 of the cup-shaped housing member 42, a compensating gas back fill is added to the resulting chamber 56 in the cup-shaped housing member 42 through suitable port means (not shown) provided in the cup-shaped housing member 42 just before the movable wall means 49 has the outer peripheral portion 47' of the diaphragm 46 soldered to the cup flange 45 so as to seal closed the chamber 56 in the manner illustrated in FIG. 2. The chamber 56 of the transducer 20 is then evacuated and by providing a suitable load spring (not shown) acting on the movable wall 49 in a direction in opposition to the force of the compression spring 52, the transducer 20 now comprises an absolute pressure sensor capsule whereby the crystal 22 will provide a varying output electrical signal that is substantially proportional to the pressure being applied to the movable wall 49 whether or not that pressure results from a pressure differential acting across the movable wall 49 or by an external force pushing on the movable wall 49 all in a manner well known in the art, such as is set forth in the aforementioned eleven U.S. patents that are incorporated into this disclosure by the previous reference thereto.

Thus, it can be seen that the transducer 20 as made by the method of this invention firmly mounts the crystal 22 therein by the looped spring member 24 forming part of the support means 21 and holding the crystal 22 between the seating members 23 thereof, each seating member 23 having the medial portion 57 thereof disposed in the opening 36 of the respective end means 25 and 26 of the looped spring member 24 so that the outer portion 51 thereof extends outboard of that end means 25 or 26 in one direction and the inner portion 58 thereof extends outboard of that end means 25 or 26 in a direction that faces toward the like portion 58 of the other seating member 23.

Referring now to FIGS. 9-14, another oscillating crystal force transducer of this invention is generally indicated by the reference numeral 20A and parts thereof similar to the transducer 20 previously set forth are indicated by like reference numerals followed by the reference letter "A".

As illustrated in FIGS. 9-14, it can be seen that the transducer 20A includes a supporting means 21A that comprises the looped spring member 24A carrying the piezoelectric quartz crystal member 22A between the seating members 23A that are respectively carried by the end means 25A and 26A of the looped spring member 24A by having the medial portion 57A thereof press fitted or otherwise secured in an opening means 36A formed through the respective end means 25A or 26A.

Figure 11:
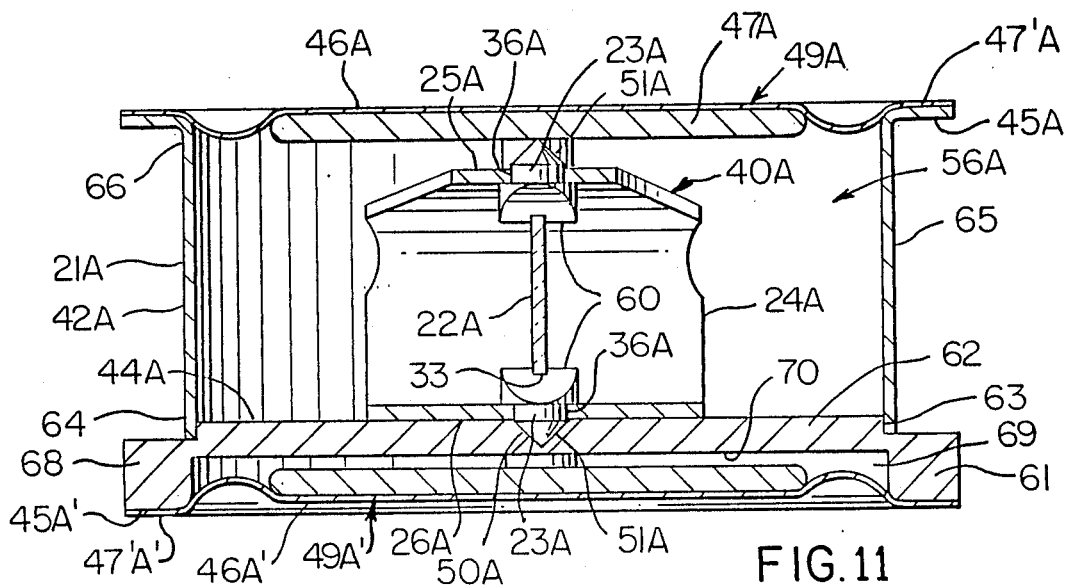
FIG. 11 is a cross-sectional view taken on line 11—11 of FIG. 10.

However, each seating member 23A differs from the seating member 23 previously described as that medial portion 57A thereof comprise a substantially cylindrical section with the outer portion 51A thereof being substantially conically-shaped and the inner portion 58A thereof being substantially chisel-shaped and defining a substantially flat elongated knife edge means 60 that has its long dimension disposed transverse to the long dimension of the plate-like crystal 22A which has the peripheral edge means 33A thereof embedded therein in the manner illustrated in FIG. 11 for the same reasons as previously set forth in regards to the ball seating members 23 of the transducer 20.

Therefore, it can be seen that the seating members for the looped spring member of this invention can take various forms and still provide the unique features of this invention, namely, firmly mount the crystal in the mouth of the looped spring member and provide the means for locating the looped spring member in the transducer and providing means for a movable wall of the transducer to act on a line through the crystal between those seating members.

The supporting structure 21A of the transducer 20A comprises the cup-shaped metallic housing member 42A with the housing member 42A being formed from a base plate means 61 having a reduced size annular portion 62 extending therefrom in a stepped manner to define an annular shoulder 63 which is telescopically disposed within an end 64 of a tubular wall means 65 that defines the outwardly directed annular flange 45A at the other end 66 thereof, the tubular member 65 being secured to the annular shoulder 63 in any suitable manner, such as by soldering or the like.

The movable wall means 49A of the transducer 20A has the outer peripheral portion 47'A of the flexible diaphragm 46A thereof secured to the flange 45A, such as by soldering or the like, whereby the backup plate means 47A of the movable wall means 49A is adapted to engage against the apex 67 of the upper seating member 23A in the same manner that the backup plate 47 of the transducer 20 engages against the upper seating member 23 thereof as previously described.

The transducer 20A includes a second movable wall means 49A' that has the outer peripheral portion 47'A' of the diaphragm 46A' thereof secured to an annular shoulder means or flange means 45A' of the support plate means 61 and which is defined by an outwardly directed annular portion 68 of the support plate means 61 that cooperates with the stepped medial portion 62 thereof to define a spacing 69 between the backup plate means 47A' of the movable wall means 49A' and the outwardly facing surface 70 of the medial portion 62 of the plate means 61 as illustrated.

The medial portion 62 of the plate means 61 has a plurality of openings 71 passing therethrough to fully fluidly interconnect the spacing 69 with the chamber 56A in the cup-shaped housing member 42A, a plurality of rigid post means 72 extend respectively and loosely through the openings 71 and have opposed end means 73 respectively interconnected to the backup plate means 47A and 47A' of the movable wall means 49A and 49A' so that the movable walls 49A and 49A' will move in unison relative to the support means 21A of the transducer 20A for a purpose hereinafter set forth.

The medial portion 62 of the plate means 61 has a conically-shaped dimple means or indentation 50A formed in the interior surface means 44A thereof and receives the conical portion 51A of the lower seating number 23A therein for positively locating the subassembly 40A in the chamber 56A. If desired, the dimple 50A could be so shaped that the lower end means 26A of the looped spring member 24A will actually abut against the surface means 44A of the plate 61 when the lower seating member 23A has its lower portion 51A fully received in the dimple 50A as illustrated in FIG. 10 whereby the end means 26A is directly soldered or otherwise secured to the surface means 44A of the plate 61 as illustrated.

Figure 10:
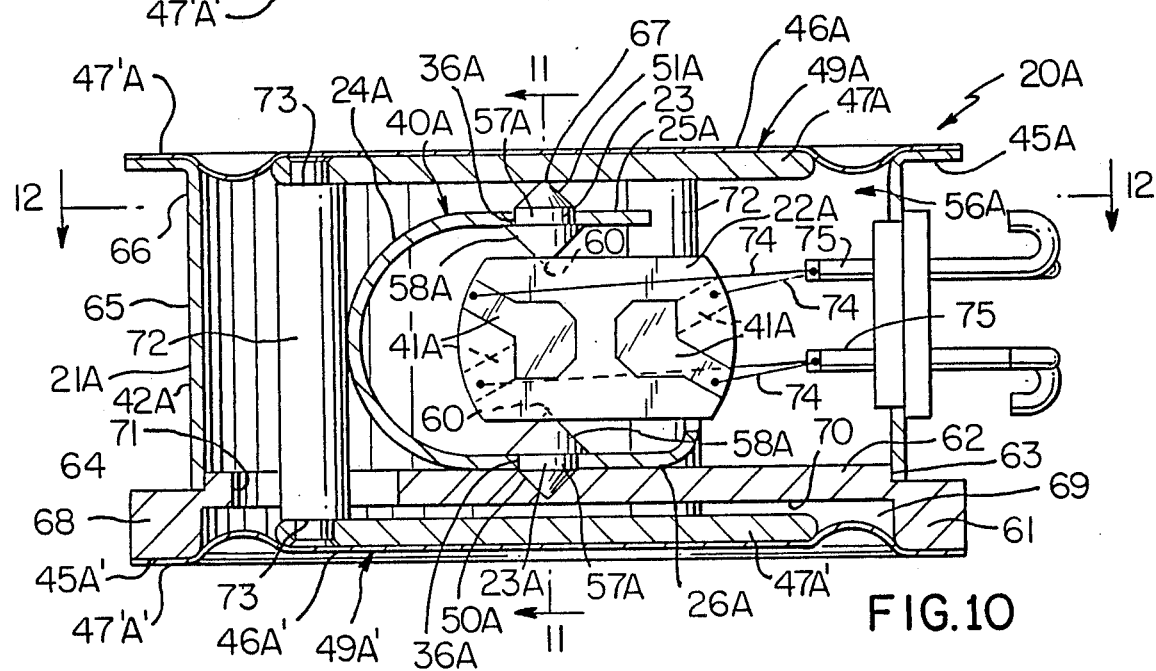
FIG. 10 is an enlarged cross-sectional view taken on line 10—10 of FIG. 9.

Thus, it can be seen that by merely evacuating the resulting chamber 56A and its interconnected compartment 69, the transducer 20A can be utilized as a pressure gauge or for measuring the pressure differential that acts respectively on the movable wall means 49A and 49A' because as the movable wall means 49A' moves upwardly in FIG. 10 the force on the crystal 22A is decreased whereas as the movable wall means 49A' moves downwardly in FIG. 10 the force on the crystal 22A is increased.

As illustrated in FIGS. 10 and 11, suitable electrical leads 74 can electrically interconnect the conductive means 41A on the crystal 22A to terminal means 75 that extend inwardly and outwardly of the cup-shaped casing 42A for external interconnection thereto for reasons well known in the art.

Therefore, it can be seen that this invention not only provides a new oscillating crystal force transducer, but also this invention provides a new method of making an oscillating crystal force transducer.

While the forms and methods of this invention now preferred have been illustrated and described as required by the Patent Statute, it is to be understood that other forms and method steps can be utilized and still fall within the scope of the appended claims wherein each claim sets forth what it believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In an oscillating crystal force transducer comprising support means, a substantially flat plate-shaped piezo-electric crystal having opposed flat sides and a relatively narrow peripheral edge means extending between said opposed sides, and two seating members carried by said support means and respectively engaging said peripheral edge means of said crystal and arranged to apply a force to said crystal along a line extending through said crystal from one of said seating members to the other of said seating members, the improvement wherein said support means comprises a looped substantially flat ribbon-like spring member having a longitudinal axis disposed in a generally U-shape and having opposed free end means spaced from each other to define the mouth of said looped spring member and respectively carrying said seating members whereby said crystal is disposed in said mouth of said looped spring member between said seating members thereof in a manner to be substantially coplanar with said longitudinal axis of said spring member.

2. A transducer as set forth in claim 1 wherein each said seating member has a ball-like surface engaging said peripheral edge means of said crystal.

3. A transducer as set forth in claim 2 wherein said peripheral edge means of said crystal has opposed substantially flat parallel sections respectively being engaged by said ball-like surface of said seating members.

4. A transducer as set forth in claim 1 wherein each said seating member has a generally chisel-shaped surface engaging said peripheral edge means of said crystal.

5. A transducer as set forth in claim 4 wherein said peripheral edge means of said crystal has opposed substantially flat parallel sections respectively being engaged by said chisel-shaped surfaces of said seating members, each said chisel-shaped surface having the long dimension thereof disposed substantially transverse to the long dimension of its respective flat section of said peripheral edge means of said crystal.

6. A transducer as set forth in claim 1 wherein said looped spring member has two openings respectively extending through said opposed end means thereof, said seating members being respectively mounted in said openings.

7. A transducer as set forth in claim 6 wherein each said seating member has opposed ends and a medial portion intermediate said opposed ends thereof, each said seating member having its said medial portion disposed in its respective opening and its said opposed ends respectively extending outboard of its respective end means of said looped spring member.

8. A transducer as set forth in claim 7 wherein each said seating member has one of its said opposed ends facing toward said one opposed end of said other seating member, said one opposed ends of said seating members engaging said peripheral edge means of said crystal.

9. A transducer as set forth in claim 8 wherein said crystal has said peripheral edge means embedded into said one opposed ends of said seating members.

10. A transducer as set forth in claim 8 wherein said support means comprises a relative rigid frame member having a surface means provided with an indentation therein, one of said seating members having the other of said opposed ends thereof disposed in said indentation whereby said indentation locates said looped spring member in said transducer.

11. A transducer as set forth in claim 10 wherein said transducer has a movable wall means carried by said support means and engaging the other of said opposed ends of the other of said seating members whereby said movable wall means increases the force acting along said line through said crystal as said movable wall means moves in a direction toward said crystal and decreases said force as said movable wall means moves in a direction away from said crystal.

12. A transducer as set forth in claim 11 wherein said movable wall means comprises a flexible diaphragm.

13. A transducer as set forth in claim 11 wherein each said seating member comprises a ball.

14. A transducer as set forth in claim 11 wherein each said seating member has said one opposed end thereof being generally chisel-shaped and has the other opposed end thereof being generally conically shaped.

15. A transducer as set forth in claim 1 wherein said spring member is formed of metallic material.

16. A transducer as set forth in claim 15 wherein said spring member is formed of high carbon steel.

17. A transducer as set forth in claim 15 wherein said spring member is formed of stainless steel.

* * * * *